Oct. 30, 1923.  
W. A. BARROWS  
1,472,112  
MEASURING AND DISPENSING MACHINE  
Filed May 6, 1921  2 Sheets-Sheet 1
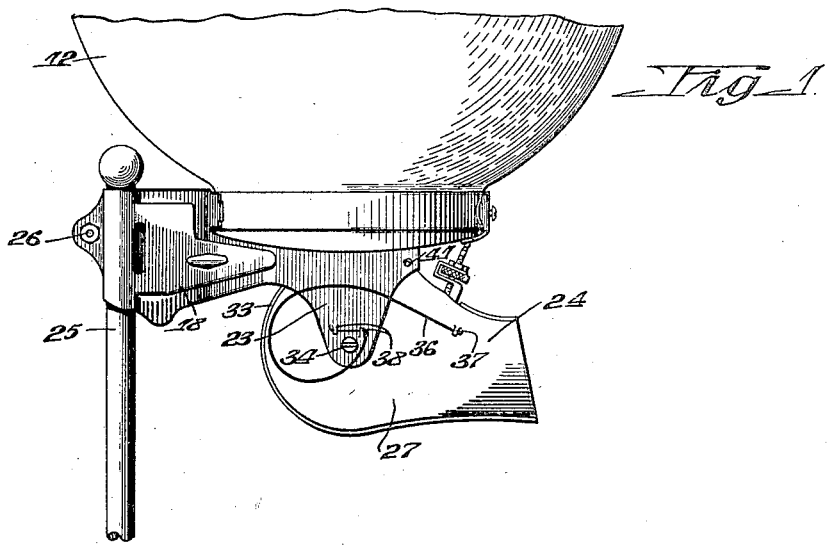
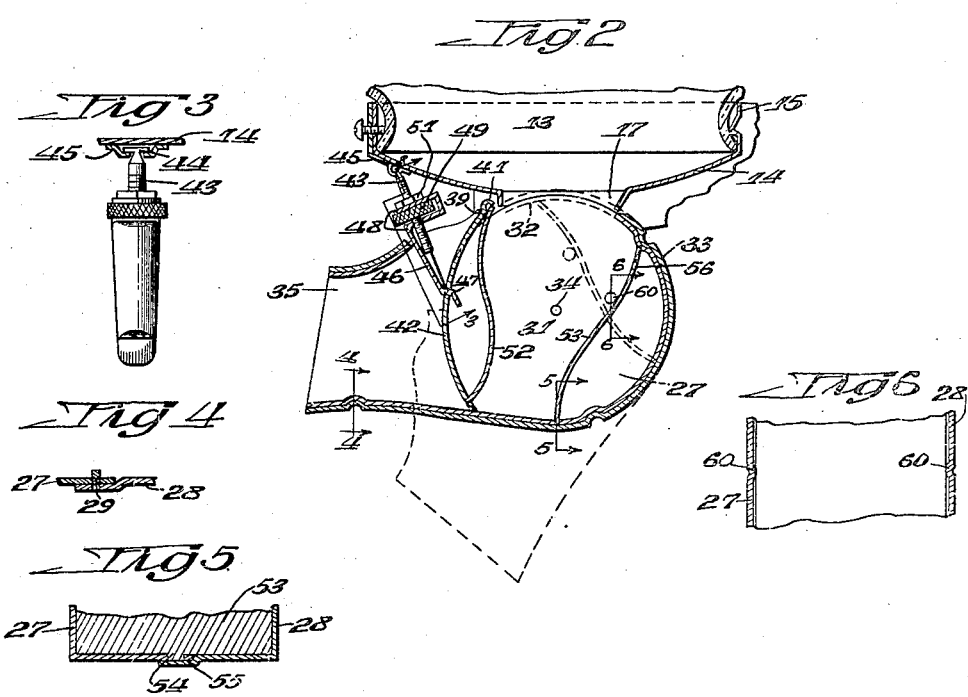

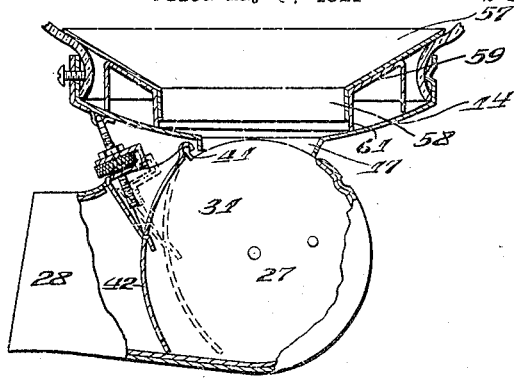
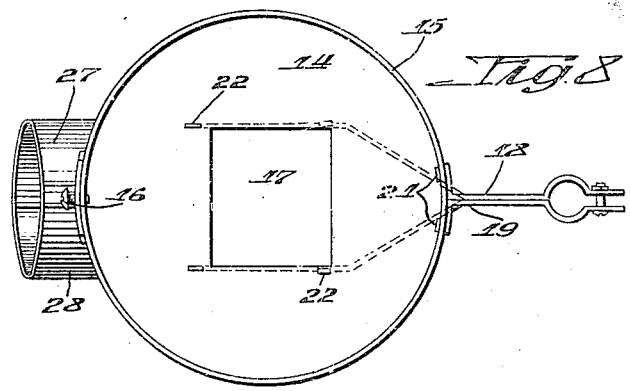
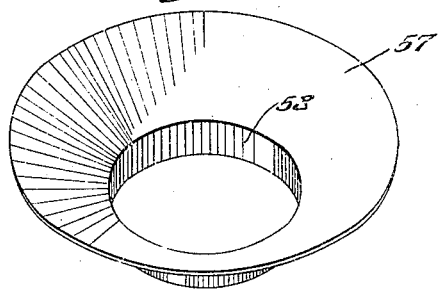
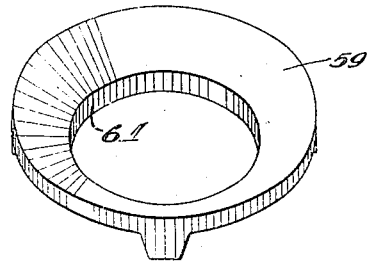

Patented Oct. 30, 1923.

1,472,112

UNITED STATES PATENT OFFICE.

WALTER A. BARROWS, OF BELVIDERE, ILLINOIS, ASSIGNOR TO THE JUSTRITE MEASURING MACHINE COMPANY, OF BELVIDERE, ILLINOIS, A CORPORATION OF ILLINOIS.

MEASURING AND DISPENSING MACHINE.

Application filed May 6, 1921. Serial No. 467,346.

*To all whom it may concern:*

Be it known that I, WALTER A. BARROWS, a citizen of the United States, residing at Belvidere, in the county of Boone and State of Illinois, have invented certain new and useful Improvements in Measuring and Dispensing Machines, of which the following is a specification.

This invention pertains in general to dispensing devices, and has more particular reference to those adapted for dispensing a predetermined bulk, such as are desirable for use by retailers in merchandising and selling over the counter various commodities such as coffee, tea, rice, peanuts, etc.

One of the primary objects of this invention is to provide a dispensing and measuring device or machine of generally improved construction, whereby the contents to be sold may be kept in a sanitary container in view of the customer and may be quickly and easily delivered in predetermined bulk quantities.

Another important object is the provision of a measuring and dispensing device characterized by a hopper having a discharge opening at its bottom and a tiltable measuring receptacle beneath the hopper equipped with a cut-off wall with a delivery spout, and in the provision of novel means for varying the capacity of the receptacle, including both adjustable and removable walls whereby the bulk to be delivered may be measured to a fine degree of accuracy, and whereby also the bulk may be conveniently varied in accordance with the different variety or size of contents, such for example as peanuts, so that the bulk delivered will be of a given weight.

Another object is to provide in a measuring and dispensing device of the character described, a supplemental bottom for the hopper of special utility in dispensing said commodities.

Still another object resides in the novel design and construction of parts described hereinafter with the view to promoting simplicity and durability, and also to enable production at a comparatively low cost.

Other objects and attendant advantages will be appreciated hereinafter as the invention becomes better understood by reference to the following description when considered in connection with the accompanying drawings, in which—

Figure 1 is a side elevation of a measuring and dispensing machine embodying my invention;

Fig. 2, a vertical sectional view through the tiltable measuring box and the lower end of the hopper;

Fig. 3, a detail sectional view taken substantially on the line 3—3 of Fig. 2;

Figs. 4, 5 and 6, detail sectional views taken on the lines 4—4, 5—5, and 6—6 respectively, of Fig. 2.

Fig. 7, a sectional view through the measuring box and bottom of the hopper showing the supplemental bottom in position;

Fig. 8, a view looking down upon the top of the hopper base; and

Figs. 9 and 10, perspective views of the supplemental bottom and a supporting ring therefor, respectively.

My improved measuring and dispensing device or machine is particularly designed for use on a counter or shelf as to give a full display of the contents to be sold. In its preferred form the hopper consists of a glass globe 12 inverted as shown, with its open end 13 seated in an annular base member having a downwardly converging bottom 14 and a raised annular edge 15. The glass hopper may be secured to the base by any suitable means, such for example as one or more screws 16 engaging the concave neck of the globe. The downward converging bottom of the base terminates in a discharge opening 17. The base is supported by a bracket formed of two similarly shaped side pieces 18 and 19 which have parts 21 extending through and turned inwardly over the upturned wall 15 of the base, thereby rigidly securing the upper portion of the bracket thereto. The side pieces diverge as indicated in dotted lines in Fig. 8, and follow the contour of the underside of the base so as to support the same at both sides of the discharge opening, said sides having small extensions or lugs 22 passing through and riveted to the bottom of the base. The sides are also shaped to provide depending ears 23 upon and between which a measuring and dispensing receptacle, designated generally by character 24, is pivoted. The sides are also shaped to embrace a supporting post 25 and are adapted to be clamped thereto by means of the bolt 26.

The receptacle 4 is preferably formed of two half sections 27 and 28 dividing the receptacle longitudinally. These half sections overlapping at their meeting edges as shown in Figs. 2, 4 and 5, are secured together by punching a small portion 29 of the outer section into the lapped body portion of the inner section, thereby firmly uniting the parts. Said sections are shaped to jointly provide a compartment 31 having a receiving opening 32 registering with the discharge opening 17 in the base, a cut-off wall 33 concentric with the pivot bolts 34, which pivotally support the receptacle upon and between the ears 23, and a delivery spout 35. The receptacle is held in the normal position shown in full lines by two wire springs 36, one at each side, each spring having one end detachably hooked under a lug 37 on the receptacle and the opposite end under oppositely disposed lugs 38 on the adjacent ear 23 of the supporting bracket. These springs constantly urge the receptacle in a clockwise direction viewing Fig. 2, to the full line position limited by suitable stops, such for example as those effected by the abutments 39 on the sides 31, which impinge the laterally turned pivots 41 of a closure or gate 42. The springs may obviously be quickly removed and replaced simply by withdrawing the ends from their respective holding lugs. The closure 42 pivotally suspended upon and between the sides 27 and 28 reaches to the bottom of the receptacle (with the latter in its normal position) and defines the front wall of the measuring compartment. This closure may be adjusted about its pivotal mounting 41 to vary the capacity of said compartment, and to this end I have provided an improved adjusting means comprising a threaded member 43 having a T-shaped end 44 seated in a bracket 45 secured by the screw 16 to the hopper base, and a member 46 pivoted at 47 to the closure 42 and shaped to provide opposed shoulders 48 between which is located a nut 49 threadingly engaging the member 43. By turning the nut 49 the closure 42 may be adjusted on its pivot as will be obvious. A nut 51 on the threaded member 43 serves to lock the connection in any set position.

From the foregoing, it will be evident that the measuring compartment 31 will be filled by the contents gravitating from the hopper. When it is desired to dispense the predetermined bulk contained in said compartment, the operator presses downwardly on the spout of the receptacle in a quick movement, thereby tilting the receptacle upon its pivots against the pressure of the springs 36 and causing the wall 33 to cut off the supply from the hopper, and at the same time withdrawing the lower wall of the receptacle from the closure 42 and permitting the contents to discharge downwardly through the spout. Upon releasing the receptacle, the springs return it to normal position in which it will be automatically refilled.

In addition to the means for adjusting the closure 42 for varying the capacity of the measuring compartment, I have also provided false walls therein permitting a considerably greater range of variety. The front and rear walls 52 and 53 are mounted respectively on the closure 42 and the rear wall of the receptacle, each having at its lower ends a lug 54, which enters a locating recess 55 in its respective holding member, and each may have at its upper end a somewhat similar lug entering a similar recess, or a small projection 60 may be pressed from the side walls to serve as a retaining means, yet permitting withdrawal of the false wall by crowding it past such projection, due to the flexibility of the sides. This provides a detachable mounting for the false front and back walls so that by inserting a wire hook or the like in a hole 56 in such wall, it may be quickly and easily removed through the opening 17, without disassembling the device. Obviously these walls may be replaced with equal facility. It follows, therefore, that the measuring and dispensing device may be suited to a wide range of commodities and the weight of the contents to be dispensed may be very accurately determined.

In handling certain commodities, such as the larger varities of shelled peanuts, I prefer to employ in the hopper a supplemental bottom 57 having a circular discharge opening 58 of greater area than the opening 17, thus providing a larger throat, the wall of which offers less resistance than the base 14 and will permit free gravitation of the contents without bridging. The supplemental bottom 57 rests on the inner walls of the hopper as shown plainly in Fig. 7, and is supported by a supplemental base 59 which rests on the base proper and has a throat part 61 seating directly on the base so that there will be no open space in the throat as might be occasioned in the event that the supplemental bottom 57 was supported higher in one case than in another, due to discrepancies in dimensions of the several parts.

As mentioned above, I have aimed to so design the parts that they will not only function to produce the desired results, but also so that they may be produced at a comparatively low cost. It will accordingly be noted that practically all of the parts are of such unique design that they may be pressed from sheet metal and assembled easily and quickly. When the device is to be used for dispensing peanuts, I prefer that all of the parts with the exception of the glass hopper, shall be formed from sheet aluminum, which is not affected by the presence of salt.

It is believed that the foregoing conveys a clear understanding of the objects prefaced above, and while I have illustrated and described but a single working embodiment, it should be understood that considerable change might be made in details of construction without departing from the spirit and scope of the invention as expressed in the appended claims: in which—

I claim:

1. A measuring and dispensing device of the character described comprising a hopper, a measuring receptacle pivotally mounted beneath the hopper and adapted to be filled by contents gravitating from the hopper, said receptacle having spaced side walls connected by intermediate walls including a cut-off wall at one end of the receptacle and shaped to provide a delivery spout at the opposite end thereof, and a closure in said receptacle defining the front wall thereof, said closure carrying on its inner side a wall reaching from side to side of the receptacle and substantially from top to bottom thereof and being detachably mounted at its upper and lower ends on the closure.

2. A measuring and dispensing device of the character described comprising a hopper, a measuring receptacle pivotally mounted beneath the hopper and adapted to be filled by contents gravitating from the hopper, said receptacle having spaced side walls connected by intermediate walls including a cut-off wall at one end of the receptacle and shaped to provide a delivery spout at the opposite end thereof, a closure in said receptacle defining the front wall thereof, and a supplemental rear wall for the receptacle reaching from side to side thereof and substantially from the top to the bottom of said cut-off wall and having interfitting connections at its upper and lower ends with said cut-off wall.

3. A measuring and dispensing device of the character described, comprising a hopper, a measuring receptacle pivotally mounted beneath the hopper and adapted to be filled by contents gravitating from the hopper, said receptacle having spaced side walls connected by intermediate walls including a cut-off wall at one end of the receptacle and shaped to provide a delivery spout at the opposite end thereof, a closure in said receptacle defining the front wall thereof, and a front and rear supplemental wall in said receptacle, the former being detachably connected to the inner side of said closure and the latter to the inner side of said cut-off wall, said supplemental walls being so relatively disposed, when the receptacle is in the contents-receiving position, as to converge downwardly, whereby to restrict the capacity of the lower portion of the receptacle without changing the filling opening at the top.

4. In a measuring and dispensing device of the character described, the combination of a hopper, a tiltable measuring receptacle beneath the hopper adapted to be filled by contents gravitating therefrom, said receptacle having a delivery spout in a cut-off wall, a closure in said receptacle defining the front wall thereof and determining the contents capacity of the receptacle, and means for varying said capacity comprising a supplemental transverse wall in the receptacle so arranged as not to restrict the filling opening at the top portion of the receptacle, but to restrict the contents capacity.

5. A measuring and dispensing device of the character described comprising an upright supporting post, a bracket secured to said post and extending laterally therefrom, an annular base supported by said bracket and having a discharge opening, a hopper removably mounted upon said base so as to discharge its conttents into said opening, said bracket having depending ears at the sides of said opening, and a measuring receptacle tiltably mounted upon and intermediate said ears and having a receiving opening normally registering with said discharge opening in the base and having a delivery spout through which the contents will be delivered when said receptacle is tilted downwardly.

6. In a measuring and dispensing device of the character described, the combination of a hopper having an annular open bottom, a base in which the bottom of the hopper seats and is secured, the base having a downwardly converging bottom terminating in a discharge opening, a tiltable measuring receptacle beneath said discharge opening, and a supplemental bottom within the hopper converging downwardly and terminating in a discharge opening of greater area than that in the base.

7. A measuring and dispensing device of the character described comprising a hopper having a bottom discharge opening, a measuring receptacle formed of two half sections dividing it longitudinally and shaped to provide a measuring compartment, a cut-off wall and a delivery spout, means pivotally supporting said receptacle below the hopper in such position that the measuring compartment will be filled by the contents gravitating through the open discharge opening, and a wall within and independent of the receptacle separating said compartment from the delivery spout and opening and permitting the contents of said compartment to be delivered through said spout when the receptacle is tilted.

8. A measuring and dispensing device of the character described comprising a hopper having a bottom discharge opening, a measuring receptacle formed of two half sections dividing it longitudinally and shaped to provide a measuring compartment, a cut-off wall and a delivery spout, said sections over-lapping at their meeting edges and the material of one over-lapping edge being pressed into that of the other, and means pivotally supporting said receptacle below the hopper in such position that the measuring compartment will be filled by the contents gravitating through the open discharge opening, and a wall within and independent of the receptacle separating said compartment from the delivery spout opening and permitting the contents of said compartment to be delivered through said spout when the receptacle is tilted.

9. A measuring and dispensing device of the character described comprising a hopper, a measuring receptacle pivotally mounted beneath the hopper and having a receiving opening at its top and a delivery spout at one side and further provided with a cut-off wall adapted to close the supply from the hopper when the receptacle is tilted to discharge its contents through said delivery spout, a pivoted wall in said receptacle between its receiving opening and delivery spout defining the capacity of the receptacle, and means adjustably connecting said pivotal wall to a stationary part including a threaded member pivotally supported at one end and a member equipped with a nut threadingly engaging said screw member whereby through adjustment of said nut said wall may be adjusted to vary the capacity of said receptacle.

10. A measuring and dispensing device of the character described comprising a globe hopper, a base ring upon and in which said hopper is secured, the bottom of said base ring having a discharge opening, a sheet metal bracket having two sides secured to said base ring and shaped beyond the same to provide a supporting arm and extending beneath the base at the opposite sides of its discharge opening, and a measuring and dispensing receptacle pivotally mounted upon and between said sides and adapted to be filled by contents gravitating through the discharge opening in said base, and to dispense said contents by tilting.

WALTER A. BARROWS.